(12) United States Patent
Sudo et al.

(10) Patent No.: US 8,281,620 B1
(45) Date of Patent: Oct. 9, 2012

(54) APPARATUS FOR MANUFACTURING VITREOUS SILICA CRUCIBLE

(75) Inventors: Toshiaki Sudo, Akita (JP); Takeshi Fujita, Akita (JP)

(73) Assignee: Japan Super Quartz Corporation, Akita (JP)

( * ) Notice: Subject to any disclaimer, the term of this patent is extended or adjusted under 35 U.S.C. 154(b) by 0 days.

(21) Appl. No.: 13/095,425

(22) Filed: Apr. 27, 2011

(51) Int. Cl.
*C03B 19/09* (2006.01)

(52) U.S. Cl. .............. 65/144; 65/17.3; 65/17.4; 65/157

(58) Field of Classification Search .......... 65/17.3–17.6, 65/144
See application file for complete search history.

(56) References Cited

U.S. PATENT DOCUMENTS

| | | | | |
|---|---|---|---|---|
| 5,762,672 A | * | 6/1998 | Ikeda et al. | 65/17.3 |
| 5,954,875 A | * | 9/1999 | Kato et al. | 117/217 |
| 6,548,131 B1 | * | 4/2003 | Fabian et al. | 428/34.4 |
| 6,553,787 B1 | * | 4/2003 | Akiho et al. | 65/17.3 |
| 2002/0170316 A1 | * | 11/2002 | Leist et al. | 65/17.3 |
| 2009/0084308 A1 | * | 4/2009 | Kishi et al. | 117/13 |
| 2009/0145351 A1 | * | 6/2009 | Kishi et al. | 117/208 |
| 2010/0071417 A1 | * | 3/2010 | Kishi et al. | 65/66 |
| 2010/0071613 A1 | * | 3/2010 | Kishi et al. | 117/208 |
| 2010/0170298 A1 | * | 7/2010 | Fukui et al. | 65/144 |
| 2010/0229599 A1 | * | 9/2010 | Fujita et al. | 65/33.9 |
| 2010/0319609 A1 | * | 12/2010 | Sato | 117/13 |

FOREIGN PATENT DOCUMENTS

| | | | |
|---|---|---|---|
| JP | 2001089171 A | * | 4/2001 |
| JP | 2002-241077 A | | 8/2002 |
| JP | 2003-313035 A | | 11/2003 |
| JP | 2007-273206 A | | 10/2007 |
| JP | 3174261 U | * | 3/2012 |
| JP | 3174262 U | * | 3/2012 |
| JP | 3174263 U | * | 3/2012 |
| WO | WO 2009017068 A1 | * | 2/2009 |

* cited by examiner

*Primary Examiner* — Jodi C Franklin
(74) *Attorney, Agent, or Firm* — Pearne & Gordon LLP

(57) ABSTRACT

During fabrication of a vitreous silica crucible, contamination of the vitreous silica crucible due to wear particles and debris of components of an apparatus for manufacturing a vitreous silica crucible is reduced by preventing damage and wear of the components of the apparatus due to silica fume. The apparatus for manufacturing a vitreous silica crucible is divided into a lower section for accommodating a mold and a mold driving system and an upper section for accommodating an arc electrode driving system, wherein a sectioning member including one or more communication paths for allowing penetration of arc electrodes, thereby the air flow is controlled so as to reduce exchange between gas in the upper section and gas in the lower section.

5 Claims, 6 Drawing Sheets

APPARATUS FOR MANUFACTURING VITREOUS SILICA CRUCIBLE

BACKGROUND OF THE INVENTION

1. Field of the Invention

The present invention relates to an apparatus and method for manufacturing a vitreous silica crucible, which is capable of improving a yield of a crucible by reducing contamination generated during fabrication of a vitreous silica crucible, while enabling stable operation for a long time by protecting a main body of an apparatus.

2. Description of Related Art

Currently, growing of silicon single crystal constituting a raw material of a semiconductor wafer is mainly performed by using a Czochralski (CZ) method. In the Czochralski method, a seed crystal is dipped in a silicon melt accommodated in a crucible, and the seed crystal is pulled up while being rotated, thereby growing a single crystal from below the seed crystal.

In the growing of the silicon single crystal, a vitreous silica crucible is generally used so as to avoid impurities being mixed with the silicon melt. Specifically, in order to grow a high purity semiconductor crystal, or to precisely control concentration of a dopant added to a semiconductor, it is required to precisely control purity of an inner surface of a vitreous silica crucible, which contacts the silicon melt. Also, in order to improve a yield of silicon single crystal growth by continuously pulling up a plurality of single crystals, the vitreous silica crucible needs to have durability to endure long use or repetitive use.

An arc fusing method is used as a method of manufacturing a vitreous silica crucible. In this method, a deposit layer of silica powder is formed in a predetermined thickness on an inner surface of a mold having a bottom and a cylindrical shape, and powder molded body approximately corresponding to a shape of a target crucible is formed. Then, the deposit layer of the silica powder is vitrified by heating and fusing the deposit layer via a discharge through an arc electrode installed on the mold, while rotating the mold. According to the arc fusing method, since the silica powder can be fused without being contacted while limiting a heated region, contamination due to impurities in an inner surface of a vitreous silica crucible may be suppressed, thereby providing a high quality vitreous silica crucible.

However, even by using the arc fusing method, generation of silica fume generated as part of silica powder is evaporated during fusing of the silica powder is unavoidable. Specifically, a phenomenon called dropping, wherein the silica fume that adheres to and coheres to a surface of an electrode, drops onto a molten glass surface, and adheres to a crucible inner surface, has become a problem.

Also, a carbon rod is generally used as the arc electrode, but carbon particles detached when an electrode surface combusts by arc discharge tend to drop onto the molten glass surface. When the carbon particles that are dropped onto the glass surface are combusted in that spot, the carbon particles cause unevenness, and when the carbon particles remain in that spot as carbon particles, the carbon particles become impurities, thereby deteriorating quality of the vitreous silica crucible.

As countermeasures, a technology for controlling characteristics of a material of the carbon rod constituting the arc electrode so as to suppress cohesion of the silica fume or dropping of the carbon particles is being studied.

For example, JP-A-2007-273206 discloses a technology for controlling density of a carbon electrode to be within a predetermined range (1.60 g/cm$^3$ to 1.80 g/cm$^3$) and controlling a particle size of carbon to be less than or equal to 0.05 mm to suppress adhesion of silica fume to an electrode surface, thereby preventing dropping of the carbon particles onto the molten glass surface.

A technology of preventing leakage generally by setting a generation source to negative pressure under an environment where fume is generated is well known (for example, JP-A-2002-241077). However, in a process of manufacturing a vitreous silica crucible, external dust intruding into a mold also causes contamination, and thus such a technology is not preferable. To avoid this intrusion of dust, for example, JP-A-2003-313035 discloses a technology for sealing a section where a mold is installed, and circulating clean air in the section by supplying and exhausting air.

SUMMARY OF THE INVENTION

However, silica fume cannot be suppressed from floating inside an apparatus for manufacturing a vitreous silica crucible, in the technology of controlling the characteristics of a material of the carbon electrode, as described in JP-A-2007-273206. The apparatus for manufacturing a vitreous silica crucible includes an apparatus for driving a mold (mold driving apparatus), and an apparatus for controlling a location of an arc electrode, wherein a plurality of metal members are used in these apparatuses. Intrusion of fume, which is generated during an operation according to manufacturing of the vitreous silica crucible, into a gap of control members in these apparatuses is a reason for damage due to wear. Accordingly, an operation of removing the fume, exchanging worn out parts, or the like is required during maintenance, and thus efficiency of the operation of manufacturing a vitreous silica crucible is diminished.

Also, when a control device of an electrode disposed on an upper part of the mold is driven, metal particles or metal fragments may be detached from a member. When these metal particles or the like are dropped into the vitreous silica crucible, the quality of the crucible may be remarkably decreased. A phenomenon in which the silica fume coheres to worn out metal powder and the worn out metal powder drops also exists. When minute metal particles are adhered to an inner surface of the crucible, impurities may be eluted to a silicon melt when the silicon melt is formed inside the crucible, and thus it is not preferable in terms of quality. Also, a foreign body, such as a metal, an aggregation of the silica fume, or the like adhered to the inner surface of the crucible, makes stress distribution of a glass surface heterogeneity, and accelerates deterioration of the crucible as the foreign body becomes a nucleation field of local crystallization. Thus, use of the crucible for a long period of time in the operation of growing a single crystal is hindered. In the method of setting the generation source of fume in a negative pressure as disclosed in JP-A-2002-241077, foreign bodies may be attracted near to the mold.

Also, recently, a large vitreous silica crucible is required according to an increasing diameter of silicon single crystal. Consequently, driving and controlling of the mold or arc electrode tend to be complex in the apparatus for manufacturing a vitreous silica crucible. Accordingly, even if the clean air is circulated by isolating the section where the mold is installed as described in JP-A-2003-313035, a communication path through which an electrode penetrates cannot be completely closed, and thus a phenomenon in which the external dust drops into the mold cannot be eliminated.

To solve the above and/or other problems, the present invention provides an apparatus and method for manufacturing a vitreous silica crucible, which suppresses wear of an arc electrode driving member or the like that results from silica fume while preventing contamination of a vitreous silica crucible due to a foreign body, while manufacturing a vitreous silica crucible by using an arc fusing method.

1) According to a first embodiment of the present invention, there is provided an apparatus for manufacturing a vitreous silica crucible, which includes a mold having an inner surface having a bottom and a cylindrical shape, a mold driving unit for rotating the mold, at least two arc electrodes for generating an arc discharge, and an electrode driving unit for driving the arc electrodes, and fusing and vitrifying a powder molded body formed of silica powder deposited on the inner surface of the mold via a discharge through the arc electrodes, the apparatus including: a lower section for accommodating the mold and the mold driving unit, an upper section for accommodating the electrode driving unit, and a sectioning member for isolating the upper section and the lower section, the sectioning member having at least one communication path for allowing penetration of the electrodes; and an air flow controlling unit for controlling air flow in the communication path such that an exchange between gas inside the upper section and gas inside the lower section is suppressed.

2) According to a second embodiment of the present invention, there is provided the apparatus for manufacturing a vitreous silica crucible according to the first embodiment, wherein the air flow controlling unit includes an exhaust device capable of exhausting gas inside the communication path.

A dust collecting device may be installed in the exhaust device, as a collecting means that collects silica fume.

3) According to a third embodiment of the present invention, there is provided the apparatus for manufacturing a vitreous silica crucible according to the first embodiment, wherein the air flow controlling unit includes an air supply device capable of supplying gas into the communication path.

A filter for removing dust of a supplied gas may be installed in the air supply device.

4) According to a fourth embodiment of the present invention, there is provided the apparatus for manufacturing a vitreous silica crucible according to any one of the first through third embodiments, wherein the sectioning member includes first and second barrier walls having space therebetween, the space being disposed to separate the upper section and the lower section, the communication path is provided in the first and second barrier walls, and, and the air flow controlling unit comprises an exhaust device for exhausting gas in the space between the first barrier wall and the second barrier wall.

5) According to a fifth embodiment of the present invention, there is provided the apparatus for manufacturing a vitreous silica crucible according to any one of the first through third embodiments, wherein the sectioning member includes first and second barrier walls having space therebetween, the space being disposed to separate the upper section and the lower section, the communication path is provided in the first and second barrier walls, and the air flow controlling unit comprises an air supply device for supplying gas to the space between the first barrier wall and the second barrier wall.

6) According to a sixth embodiment of the present invention, there is provided the apparatus for manufacturing a vitreous silica crucible according to any one of the first through fifth embodiments, wherein the air flow controlling unit includes an exhaust device for exhausting gas from the lower section.

A dust collecting device for collecting silica fume may be installed in the exhaust device.

7) According to a seventh embodiment of the present invention, there is provided the apparatus for manufacturing a vitreous silica crucible according to any one of the first through sixth embodiments, wherein the air flow controlling unit includes an air supply device for supplying gas to the lower section.

A filter for removing dust of a supplied gas may be installed in the air supply device.

8) According to an eighth embodiment of the present invention, there is provided a method of manufacturing a vitreous silica crucible, including the steps of: forming a powder molded body by depositing silica powder on an inner surface of a mold, and fusing and vitrifying the powder molded body by fusing the powder molded body through an arc discharge generated from at least two arc electrodes while rotating the mold, wherein the vitrification is performed in a state that a lower section for accommodating the mold and a mold driving unit for driving the mold, and an upper section for accommodating an electrode driving unit for driving the arc electrodes are isolated by using a sectioning member having at least one communication path for allowing penetration of the arc electrodes; and the air flow inside the communication path is controlled such that exchange between gas inside the upper section and gas inside the lower section is suppressed.

9) According to a ninth embodiment of the present invention, there is provided the method of manufacturing a vitreous silica crucible according to the eighth embodiment, wherein gas inside the communication path is exhausted.

10) According to a tenth embodiment of the present invention, there is provided the method of manufacturing a vitreous silica crucible according to the eighth or ninth embodiment, wherein gas is supplied into the communication path.

In the method of manufacturing a vitreous silica crucible, the gas supplied into the communication path may have an air cleanliness class, which is specified by JIS B 9920 or ISO 14644-1, of less than or equal to 100000, less than or equal to 10000, more than or equal to 1 and less than or equal to 7, or preferably less than or equal to 5. Alternatively, the gas supplied into the communication path may have an air cleanliness class less than or equal to 10000, preferably less than or equal to 700 in FED-STD-209D.

11) According to an eleventh embodiment of the present invention, there is provided the method of manufacturing a vitreous silica crucible according to any one of the eighth through tenth embodiments, wherein gas inside the lower section is exhausted.

12) According to a twelfth embodiment of the present invention, there is provided the method of manufacturing a vitreous silica crucible according to any one of the eighth through eleventh embodiments, wherein gas is supplied to the lower section.

In the method of manufacturing a vitreous silica crucible, the gas supplied into the lower section may have an air cleanliness class specified by JIS, which is more than or equal to 1, preferably more than or equal to 8.

According to an apparatus for manufacturing a vitreous silica crucible of the present invention, a portion (lower section), which may have a high temperature due to disposition of a mold and is likely to generate fume, and is required to be prevented from being contaminated due to dropping of impurities while manufacturing the crucible, and a portion (upper section), which is likely to generate a contamination source, such as minute particles or the like, due to the manipulation of mechanical operation or the like, under a temperature condition of about room temperature and where an electrode controlling unit is disposed, are isolated by a sectioning member, and thus fusion and vitrification of silica powder can be performed while suppressing an exchange of gases between the upper section and the lower section. According to such a structure of the apparatus for manufacturing a vitreous silica crucible of the present invention, the gas is suppressed from moving from the lower section to the upper section, thereby suppressing an electrode driving unit in the upper section from being contaminated by silica fume generated in the lower section while fusing silica powder. Accordingly, the electrode driving unit is prevented from being damaged and worn out due to minute silica particles intruding into a sliding portion, and thus a frequency of replacing an apparatus part can be reduced. Accordingly, operations according to maintenance of the apparatus, such as cleaning after use or part replacement, may be simplified. Consequently, by using the manufacturing apparatus of the present invention, production efficiency of a vitreous silica crucible can be improved and production costs can be reduced.

Also, according to the apparatus for manufacturing a vitreous silica crucible of the present invention, the gas is suppressed from moving from the upper section to the lower section by suppressing the exchange of gases between the upper section and the lower section, thereby preventing metal fragments or wear particles generated in the upper section from intruding into the lower section. Thus, contamination of an inner surface of the crucible due to foreign bodies other than silica can be prevented. Also, when a vitreous silica crucible, which is not contaminated by impurities or to which a foreign body is not adhered, is actually used to fuse a semiconductor material, or the like, maldistribution of crystallization portions due to the foreign body or contamination does not occur. As such, when the manufacturing apparatus of the present invention is used to pull up a semiconductor crystal, such as silicon or the like, it is possible to precisely control composition, and a high quality vitreous silica crucible that is durable in long period of time can be provided.

According to the present invention, suppression of a gas exchange between the upper section and the lower section is realized by controlling gases in the communication path of the sectioning member communicating between the upper section and the lower section. In detail, in order to suppress the gas from moving from the upper section to the lower section or from the lower section to the upper section, and to suppress the gas in the communication path from being exhausted to the outside or the gas from being ejected from the communication path, a means (air flow controlling unit) of ejecting a blocking gas, such as an air curtain, may be employed near an outlet of the communication path.

According to a method of manufacturing a vitreous silica crucible of the present invention, fusion and vitrification can be performed on silica powder while suppressing a gas exchange between the lower section in which the mold is disposed, and the upper section in which the electrode controlling unit is disposed. When a vitreous silica crucible is manufactured by using the method, the electrode driving unit inside the upper section can be suppressed from being contaminated by the silica fume generated while fusing the silica powder, and thus the wear particles can be prevented from being generated according to wear due to minute silica particles intruding into the sliding portion. Also, the metal fragments or wear particles generated in the upper section can be prevented from intruding into the lower section. Accordingly, according to the method of manufacturing a vitreous silica crucible of the present invention, a vitreous silica crucible can be manufactured while preventing contamination of the inner surface of the crucible due to a foreign body other than silica. Also, when a vitreous silica crucible, which is not contaminated by impurities or to which a foreign body is not adhered, is actually used to fuse a semiconductor material, or the like, maldistribution of crystallization portions due to the foreign body or contamination is not generated. Accordingly, when the method of manufacturing a vitreous silica crucible of the present invention is used to pull up a semiconductor crystal, such as silicon or the like, it is possible to precisely control composition, and a high quality vitreous silica crucible that is durable in long period of time can be provided.

BRIEF DESCRIPTION OF THE DRAWINGS

FIGS. 6a and b are schematic views showing an electrode arrangement state of an apparatus for manufacturing a vitreous silica crucible, according to the present invention, wherein FIG. 6a is a top perspective view of disposed electrodes.

DESCRIPTION OF THE PREFERRED EMBODIMENTS

Hereinafter, embodiments of the present invention will be described with reference to the attached drawings.

First Embodiment

Figure 1:
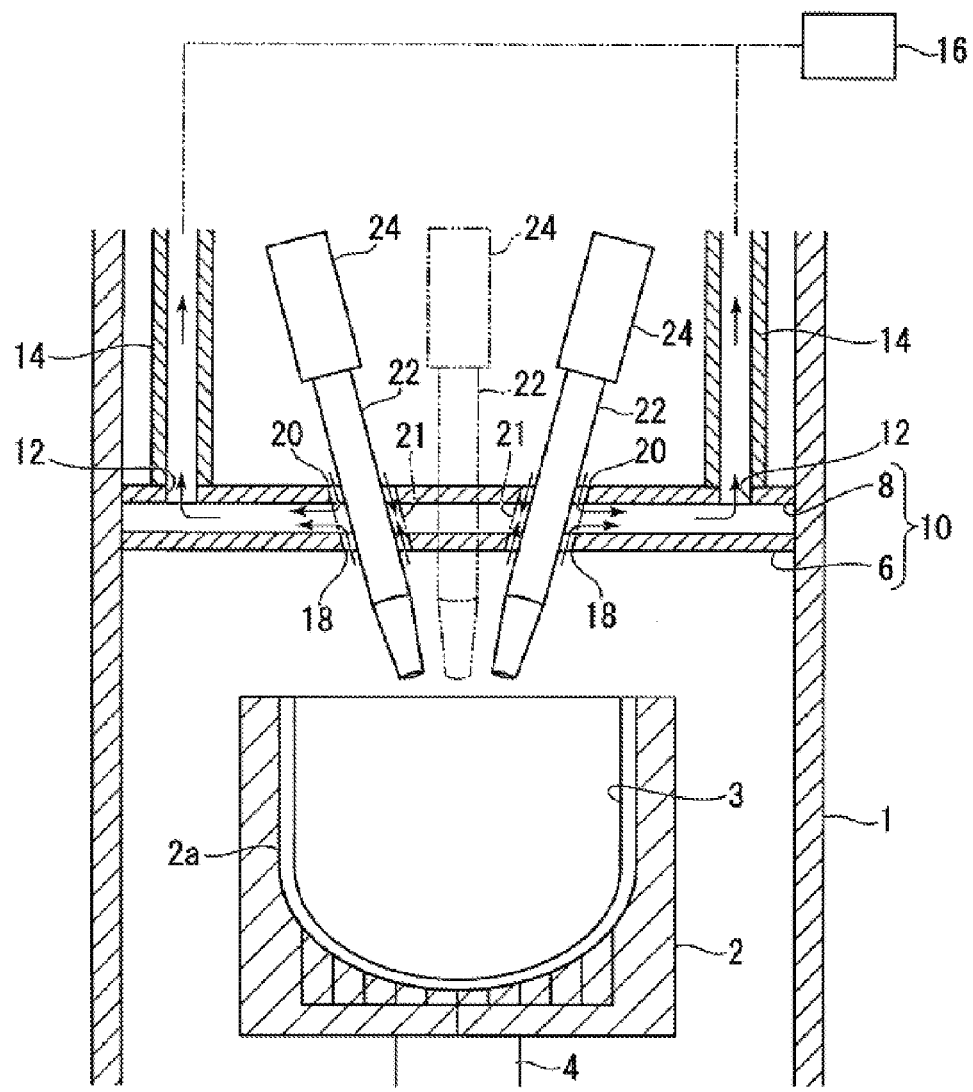
FIG. 1 is a schematic front cross-sectional view for explaining an embodiment of the present invention, taken along a line I-I of FIG. 2.
Figure 2:
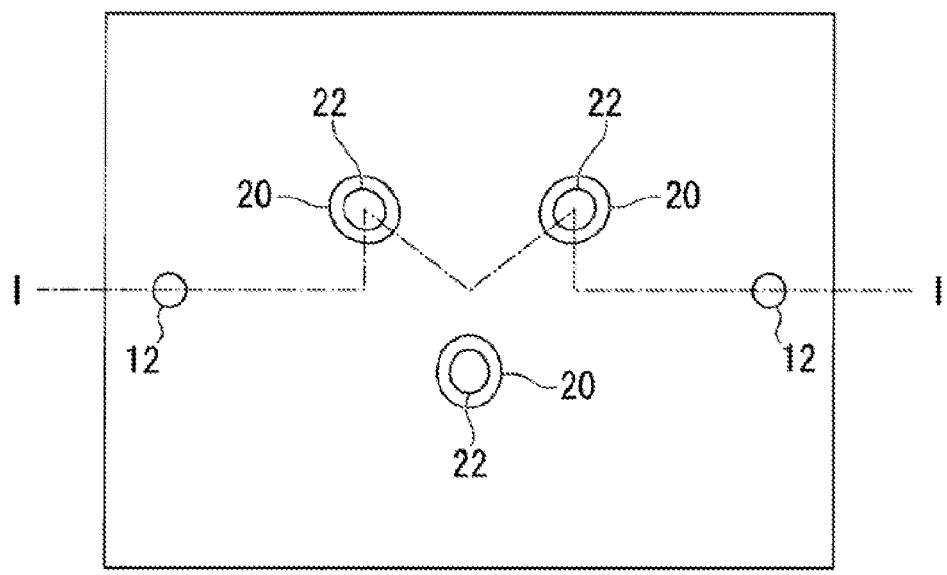
FIG. 2 is a horizontal cross-sectional view of an apparatus shown in FIG. 1.

FIG. 1 is a schematic front cross-sectional view for explaining an apparatus for manufacturing a vitreous silica crucible, according to a first embodiment of the present invention, taken along a line I-I of FIG. 2, and FIG. 2 is a horizontal cross-sectional view of the same apparatus for manufacturing a vitreous silica crucible.

The apparatus includes an apparatus chamber surrounded by a side wall 1 capable of blocking the inside of the apparatus where arc flames are generated from the outside of the apparatus. The side wall 1 may be formed of a metal or a structural material such as concrete or the like, as long as blocking (or reduction and alleviation outside of the apparatus) of an atmosphere gas, temperature, noise, vibration, etc. required in manufacturing a vitreous silica crucible is possible in the inside and outside of the apparatus. Alternatively, a heat resistant material, such as heat resistant ceramics, or the like, may be used for at least a part of the side wall 1. A shape of the side wall 1 in a plan view is not specifically limited, and may be an angled pipe shape or a cylindrical shape as long as a space for accommodating a mold 2 or the like, which is to be described later, can be formed therein.

A lower portion of the side wall 1 is installed at a bottom portion and connected to an apparatus bottom (not shown). The side wall 1, a first barrier wall (to be described later) disposed at an upper side, and the bottom portion disposed at a lower side form a processing chamber (apparatus chamber or arc fusion furnace). This chamber can be isolated or sealed from the outside in terms of air flow. A door (not shown) that can be opened and closed may be provided on at least a part of the side wall 1 so as to carry in and out the mold 2 that will be described later, or to allow an operator to enter.

The mold 2 and a mold driving unit 4 for driving the mold 2 are installed in the apparatus chamber. The mold 2 has an inner surface having a bottom and a cylindrical shape. The mold driving unit 4 may be provided outside the apparatus chamber, such as at a side lower than the bottom portion or the like, as long as being capable of driving the mold 2.

The mold (rotating mold) 2 may have a cylindrical shape with a bottom. The inner side (inner surface) of the mold 2 has a concave portion having a bowl shape and an upward opening. The inner side defines an outer shape of a vitreous silica crucible. The material of the mold 2 may be, for example, graphite. A plurality of vents 2a are provided in the mold 2. The vents are connected to a depressurizing unit (not shown) and penetrates through the inner surface of the mold 2. Thus the inside of silica powder molded body 3 formed on the inner surface of the mold 2 can be depressurized. The mold driving unit 4 rotates the mold 2 around a center axis (center axis of a cylinder inner surface). Furthermore, the mold driving unit 4 may perform, in combination, a driving of horizontal movement and vertical movement that do not change an angle of a rotation axis (central axial), inclination that changes the angle of the rotation axis, or the like.

A horizontal first barrier wall 6 is provided above the mold 2 in the apparatus chamber over an approximately entire surface (entire area surrounded by the side wall 1), in a plan view, of the apparatus chamber, and thus an upper space of the mold 2 in the apparatus chamber is isolated in terms of air flow from the outside of the apparatus chamber by the first barrier wall 6.

A second barrier wall 8 is installed over the approximately entire surface (the entire area surrounded by the side wall 1), in a plan view, of the apparatus chamber, parallel to the first barrier wall 6 at a location above and spaced apart from the first barrier wall 6.

A sectioning member 10 consisting of the first barrier wall 6 and the second barrier wall 8 forms an intermediate section inside in the vertical direction. The sectioning member (ceiling) 10 isolates and blocks an apparatus lower section in which arc heating is performed in the apparatus chamber from an apparatus upper section in which heating is not performed. In the present embodiment, perimeter shapes of the first barrier wall 6 and the second barrier wall 8 are defined by an inner surface shape of the side wall 1.

A plurality of exhaust holes 12 are provided on the second barrier wall 8 near the side wall 1 separated, in a plan view, from a center portion of the apparatus chamber where an arc is generated (to be described later). The exhaust holes 12 are disposed with equal intervals therebetween in an outline direction of the apparatus chamber in a plan view. The exhaust holes 12 communicate with the intermediate section inside the sectioning member 10. In this example, two exhaust holes 12 are disposed at the opposite locations, in a plan view, with respect to the central location of the apparatus chamber where the arc is generated.

The intermediate section inside the sectioning member 10 is communicated to an exhaust device 16 through an exhaust path 14 having a pipe shape extending upward from each of the exhaust holes 12. A dust collecting device (not shown) that collects fume is installed in the exhaust device 16.

The first barrier wall 6 includes a plurality of lower communication holes 18 at a center position of the apparatus chamber where the arc is generated. The lower communication holes 18 are disposed at uniform intervals on a circumference surrounding a center point set directly above the mold 2 constituting the center of the apparatus chamber. In this example, three lower communication holes 18 are disposed at equal intervals on the circumference, according to the number of arc electrodes 22 which will be described later. The center of the circumference on which the lower communication holes 18 are formed is a reference location in a non-driving state, and is also set to match, in a plan view, a rotation driving axis of the rotating mold 2, which is a vertical direction.

The second barrier wall 8 includes upper communication holes 20. The number of the upper communication holes 20 is identical to the number of lower communication holes 18. The upper communication holes 20 are disposed at uniform intervals on the circumference of the lower communication holes 18. The upper communication holes 20 are provided on a circumference set in the second barrier wall 8. The center thereof is on a vertical line drawn from the center of the circumference set in the first barrier wall 6. The circumference on the second barrier wall 8 has a larger radius than that of the first barrier wall. Also, the lower communication holes 18 constitutes a figure similar to that constituted by the upper communication holes 20. Thus the arc electrodes 22 can penetrate through the holes. In this example, three lower communication holes 18 and three upper communication holes 20 are disposed on three vertical surfaces each including the vertical line and a line passing through the lower communication hole 18 and the upper communication holes 20.

A communication path 21 is formed by the lower communication holes 18 and the upper communication holes 20. The communication path 21 communicates the apparatus lower portion and the apparatus upper portion via the sectioning member 10. The arc electrodes 22 each having a rod shape are disposed penetrating through the communication paths 21. The number of the arc electrodes 22 may be identical to the number of communication paths 21, i.e., the number of the upper communication holes 20. In this example, three 3-phase arc electrodes 22 are used. The arc electrode may have a tilt angle of 5° to 40° with respect to the vertical line. The arc electrodes 22 may be carbon rods. When the arc electrodes 22 are carbon electrodes, volume density may be adjusted to be within a predetermined range, for example, from 1.5 g/cm$^3$ to 2.0 g/cm$^3$.

Figure 6A:
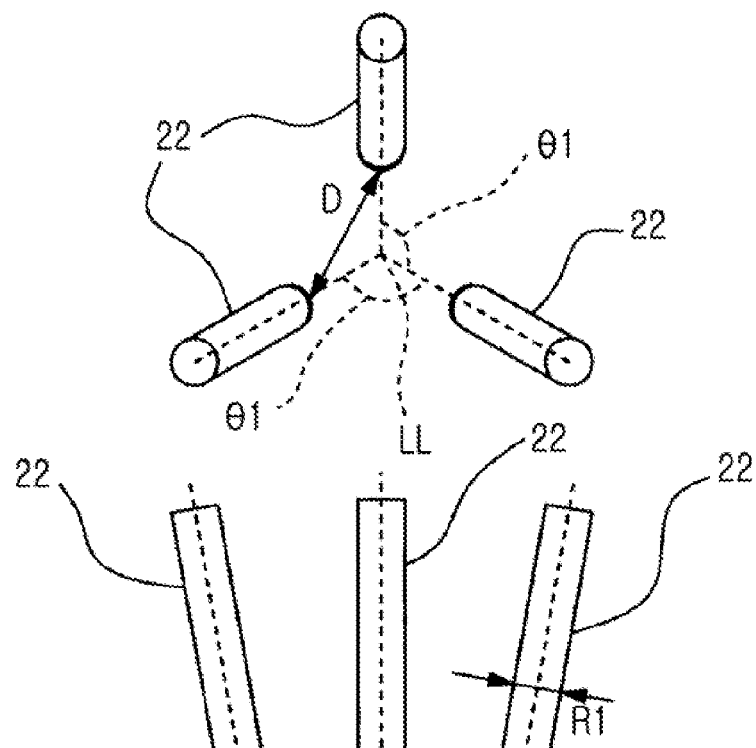
Figure 6B:
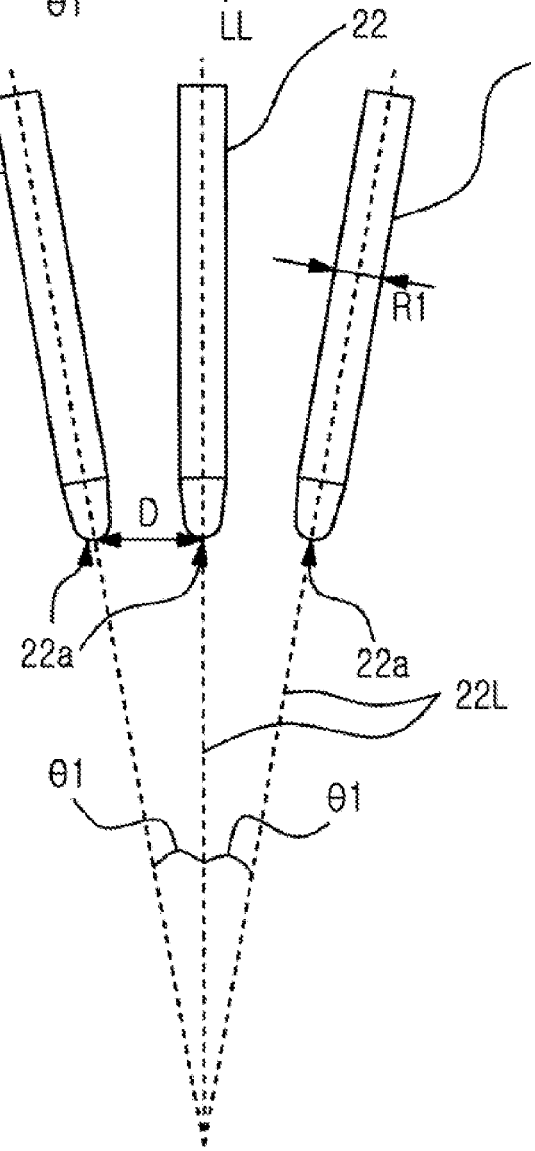
FIG. 6b is a side view of the disposed electrodes viewed on the side thereof.

The arc electrodes 22 are, for example, electrode rods each having the same shape so as to perform an alternating 3-phase (R-phase, S-phase, and T-phase) arc discharge, and are each provided such that respective axes 22L form an angle θ1 so that the arc electrodes 22 form an inverted triangular pyramid shape having the apex at the bottom, as shown in FIGS. 6a and 6b. Also, the application of electric current to each arc electrode 22 is controllable by a control unit that is not shown. In FIGS. 6a and 6b, the arc electrodes 22 are provided such that an arc flame direction matches an electrode central axis LL. The number of electrodes, an arrangement state, and a power supplying method are not limited to the above configuration, and other configurations may be employed.

An electrode driving unit 24 that drives the arc electrodes 22 is disposed above the second barrier wall 8. Although not shown herein, the electrode driving unit 24 may be fixed to the side wall 1 and the second barrier wall 8, or may be extended from the upper portion of the apparatus. The electrode driving unit 24 adjusts a location of a tip portion of each of the arc electrodes 22 via stretch and/or vertical movement. Also, the electrode driving unit 24 can set an opening angle formed by the plurality of arc electrodes 22, by adjusting the inclination of the electrodes 22 with respect to the vertical line.

As shown in FIGS. 1, 6a, and 6b, the electrode driving unit (electrode location setting unit) 24 includes a supporter that supports the arc electrodes 22 such that a distance D between the electrode tips of the arc electrodes 22 is settable, a horizontal moving unit that is capable of moving the supporter in a horizontal direction, a vertical moving unit that is capable of moving the plurality of supporters and the horizontal moving unit in a vertical direction as one body, and a rotating angle setting unit that is capable of changing a supporting angle of the arc electrode. Here, the supporter includes a rotating unit that controls a rotating angle of an angle setting axis as the arc electrodes 22 are supported to be rotatable around the angle setting axis.

In order to adjust the distance D between the electrode tips of the arc electrodes 22 and the electrode location state, the angle of each of the arc electrodes 22 is controlled by the rotating angle setting unit, while the horizontal location of the supporter is controlled by the horizontal moving unit. Also, a horizontal direction location between the electrode central axis LL and the mold rotation axis may be controlled by the horizontal moving unit. Also, a height location of each electrode tip 22a with respect to the bottom location of the silica powder molded body 3 may be controlled by controlling a height location of the supporter by using the vertical moving unit. At the same time, it is possible to displace a direction (the electrode central axis LL) in which the arc flames are generated by an angle $\psi 1$ from the vertical direction by individually setting the angles of the arc electrodes 22 by using the rotating angle setting unit.

Also, it is possible to control the height location of the electrode tip 22a by setting the sectioning member (ceiling) 10 to be moveable up and down with respect to the side wall 1 by using the vertical moving unit that is not shown.

A method of manufacturing a vitreous silica crucible according to the present embodiment will now be described.

First, silica powder is deposited on the inner surface of the rotating mold 2, so as to form the silica powder molded body 3 that approximately corresponds to a shape of a target vitreous silica crucible. Here, the silica powder indicates silicon dioxide powder whose composition is indicated substantially by $SiO_2$, and is selected from among natural and/or artificial crystalline silica powder, amorphous silica powder, etc. according to its purpose. Also, another material may be added as occasion demands.

Then, the electrode tips are disposed at a predetermined location facing the silica powder molded body 3 by using the electrode driving unit 24 and/or the mold driving unit 4.

Next, the exhaust device 16 is activated before supplying arc power, and gas in the intermediate section interposed between the first barrier wall 6 and the second barrier wall 8 is exhausted via the exhaust path 14, thereby depressurizing the inside of the intermediate section. An exhaust flow rate of the gas sucked from the lower communication holes 18 may be from 0 to 0.01 to 2400 to 20000 Nm$^3$/h as a normal flow rate, and preferably from 1000 to 1200 Nm$^3$/h. Also, a flow rate of the gas sucked from the upper communication holes 20 may be from 0 to 0.01 to 2400 to 20000 Nm$^3$/h, and preferably from 1000 to 1200 Nm$^3$/h. Alternatively, a differential pressure may be set to be more than or equal to 1 to 5 to 10 to 20 Pa and less than or equal to 100 Pa, between the intermediate section inserted between the first barrier wall 6 and the second barrier wall 8, and upper side of the sectioning member 10.

Since such conditions can be adjusted based on an actual opening area obtained by subtracting an electrode sectional area from the area of each of the upper communication holes 20 or lower communication holes 18, an exhaust speed of the exhaust device 16, a gas temperature near the communication path 21, or the like, the conditions may be set with respect to the top and bottom of the sectioning member 10 in such a way that the fume generated at the lower side of the sectioning member 10 is blocked, and a thermal affect of the arc flames to the upper side of the sectioning member 10 or the like can be reduced. In the present invention, it is possible to block or seal the air flow via such blocking of the fume and reduction of thermal effect.

After starting the exhaust, the powder mold is fused and vitrified through an arc discharge to manufacture a vitreous silica crucible by applying a predetermined voltage to the arc electrodes 22 while continuously rotating the mold by using the mold driving unit 4.

Arrows of FIG. 1 conceptually show a flow of gas when the exhaust device 16 is activated. When the powder molded body is fused during the vitrification process, the silica fume is generated as a part of the silica powder is evaporated. Since atmospheric pressure of the intermediate section becomes negative with respect to atmospheric pressure in the lower section and the upper section according to exhaustion, the gas including fume is sucked into the intermediate section via the lower communication holes 18 and moves to a side portion (radial direction), and is exhausted to the outside of the apparatus by the exhaust device 16 through the exhaust path 14. Thus, the gas including fume may be prevented or suppressed from intruding into the upper section through the upper communication holes 20.

Also, the gas of the upper section is sucked into the center section through the upper communication hole 20, moves to the side portion, and is exhausted to the outside of the apparatus by the exhaust device 16 through the exhaust path 14. Accordingly, even when dust or metal fragments are generated in the electrode driving unit or the like in the upper section, the dust or metal fragments are prevented from intruding into the lower section, thereby preventing contamination.

Second Embodiment

Figure 3:
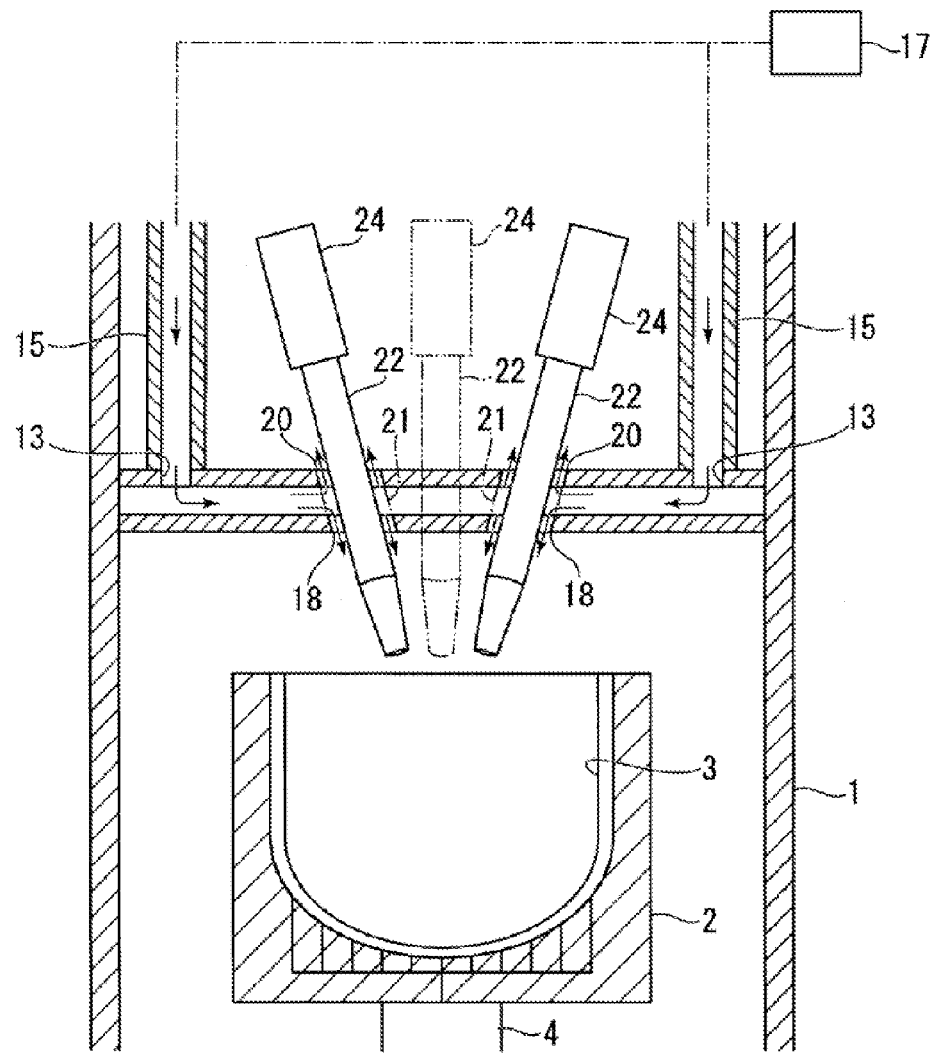
FIG. 3 is a schematic longitudinal-sectional view for explaining another embodiment of the present invention.

FIG. 3 is a view for explaining another embodiment of the present invention. The same reference numerals of FIG. 1 are used for elements having the same structure as the first embodiment, and descriptions thereof will not be repeated.

In the present embodiment, a plurality of air supply holes 13 are formed on the second barrier wall, and the intermediate section communicates with an air supply device 17 through an air supply path 15 having a pipe shape and extending upward from the air supply hole. Clean air is supplied from the air supply device 17 through a HEPA filter (high efficiency particulate air filter).

A method of manufacturing a vitreous silica crucible, according to the present embodiment will be described.

First, silica powder is deposited on the inner surface of the mold 2, and the silica powder molded body 3 is formed approximately corresponds to a shape of a target vitreous silica crucible.

Next, the electrode tip is disposed at a predetermined location facing the silica powder molded body 3 by using the electrode driving unit 24 and/or the mold driving unit 4.

Then, the air supply device 17 is activated, and air is supplied into the intermediate section inserted between the first barrier wall 6 and the second barrier wall 8, through the air supply path 15. The air flow into the intermediate section is supplied from an opening of the lower communication hole 18 to the lower section, and supplied from an opening of the upper communication hole 20 to the upper section. A flow rate of gas supplied from the lower communication hole 18 to the lower section may be from 0 to 0.1 to 20000 Nm$^3$/h, and preferably from 300 to 8000 Nm$^3$/h, and a flow rate of gas emitted from the upper communication hole to the upper section may be from 0 to 0.01 to 20000 Nm$^3$/h, and preferably from 300 to 8000 Nm$^3$/h. Such conditions may be adjusted based on an area of the opening of the upper communication hole 20 or lower communication hole 18, an air supply amount of the air supply device, or the like.

After starting the air supply, a rotation operation of the mold is started by the mold driving unit 4. Then, a predetermined voltage is applied to the arc electrodes 22 to fuse and vitrify a powder molding through an arc discharge, thereby manufacturing a vitreous silica crucible.

Arrows of FIG. 3 conceptually show a flow of gas when the air supply device 17 is activated. The air supplied from the air supply device 17 flows to the intermediate section through the air supply path 15. Accordingly, pressure of the intermediate section becomes positive pressure with respect to those of the lower section and the upper section, and thus gas is emitted from the lower communication hole 18 to the lower section while gas is emitted from the upper communication hole to the upper section. Accordingly, intrusion of air including fume generated during a silica vitrification process, into the upper section, is suppressed or prevented. Also, the air of the upper section is prevented from intruding into the lower section, and thus the vitreous silica crucible is prevented from being contaminated by dust, metal fragments, or the like generated in the upper section.

Also, the present invention is not limited to the above-described embodiments.

Figure 4:
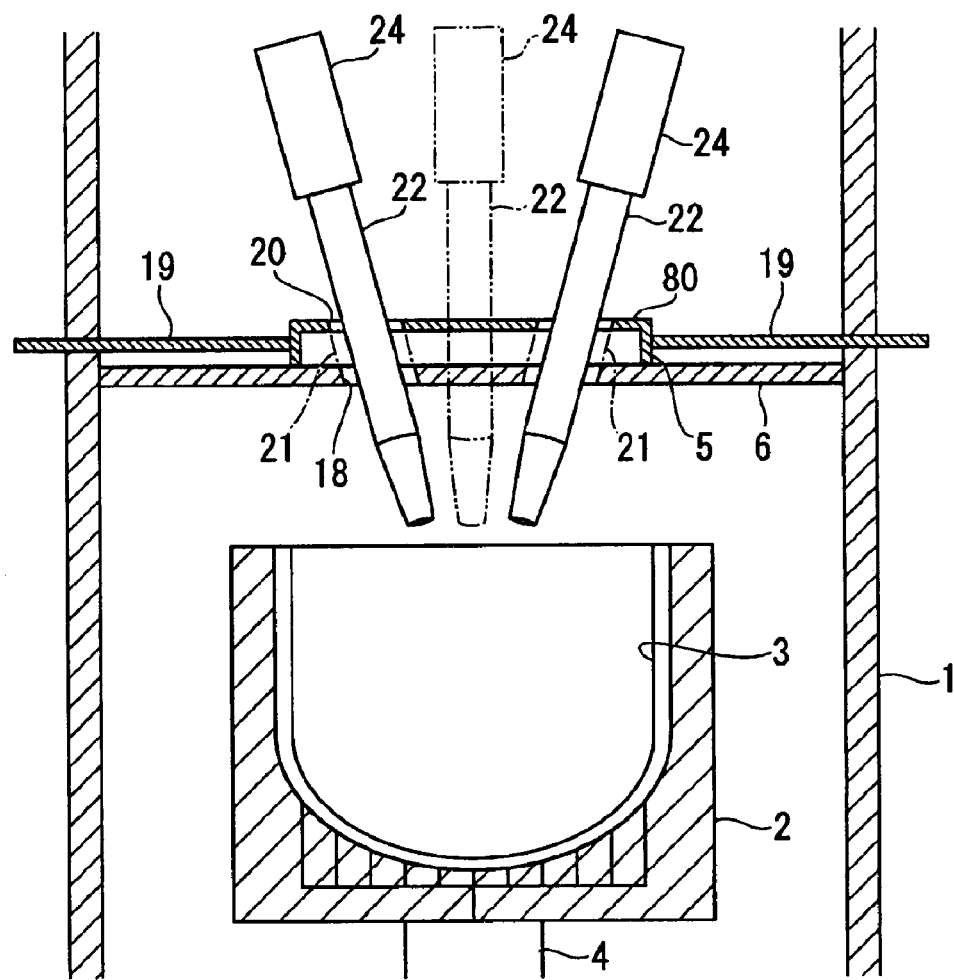
FIG. 4 is a schematic longitudinal-sectional view showing another type of a sectioning member in an apparatus for manufacturing a vitreous silica crucible of the present invention, wherein an area of a second barrier wall is small.
Figure 5:
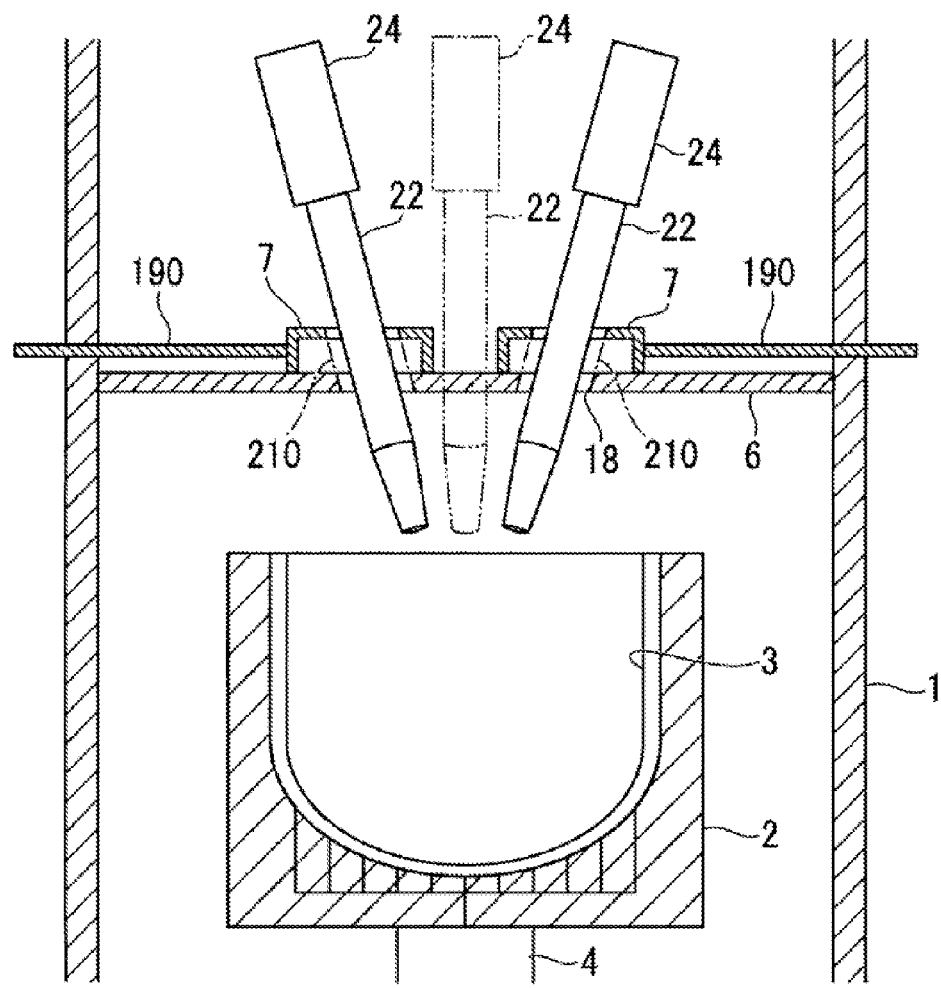
FIG. 5 is a schematic longitudinal-sectional view showing another type of the sectioning member in the apparatus for manufacturing a vitreous silica crucible of the present invention, wherein a double barrier wall is replaced by a sheath body.

For example, FIGS. 4 and 5 are schematic longitudinal-sectional views of an apparatus for manufacturing a vitreous silica crucible of the present invention, and show different configurations of the sectioning member. Also, descriptions about the elements that are described in the above embodiments and given the same reference numerals are not repeated.

In the apparatuses of the first and second embodiments, the perimeter of the side wall is disposed on an entire surface of the range in a plan view defined by the inner surface of the side wall, together with the first barrier wall and the second barrier wall, but an area of any one barrier wall may be smaller than that of the other barrier wall.

For example, as shown in FIG. 4, the first barrier wall 6 may cover the entire surface of the inner side range of the side wall in a plan view while a surrounding wall 5 surrounding the plurality of communication paths 21 is built on the first barrier wall 6, and a second barrier wall 80 having a perimeter shape defined by the surrounding wall 5 may be installed thereon while a plurality of conduit lines 19 are connected to the surrounding wall 5, so that the conduit lines 19 may communicate with the air supply device or exhaust device (not shown) outside the side wall 1.

In this case, air supply or exhaustion may be performed on the intermediate section (only the portions around the communication path 21) surrounded by the first barrier wall 6, the surrounding wall 5, and the second barrier wall 80. For example, the surrounding wall 5 may include the upper communication hole 20 in a plan view, while having a cylindrical shape constituting a circle in a plan view with respect to the central location of the apparatus chamber where an arc is generated. Here, the second barrier wall 80 may have a disk shape, wherein the plurality of upper communication holes 20 are opened. In the example in the drawing, two conduit lines 19 are connected to the intermediate section surrounded by the surrounding wall 5 and the second barrier wall 80, but the plurality of conduit lines 19 may be connected at equal intervals in a circumference direction in a plan view of the second barrier wall 80. Here, a barrier wall having a smaller area may be the first barrier wall.

Alternatively, only the first barrier wall 6 may be used as a barrier wall, and a sheath body 7 having an opening (communication path) may be installed at a lower location or upper location near each communication hole 18 formed on the first barrier wall 6. Then, air supply or exhaustion may be performed on each sheath body 7 to suck surrounding gas only near the portion of the communication hole 18, or the sheath body 7 may be used as an air curtain by ejecting gas only near the portion of the communication hole 18, thereby suppressing or preventing gas exchange between top and bottom of the first barrier wall 6 through the communication hole 18.

For example, FIG. 5 shows an example where the sheath bodies 7 having a communication hole 210 are respectively installed on the communication holes 18 of the first barrier wall, at locations identical to the number of the arc electrodes 22, and a conduit line 190 is connected to each sheath body 7. The conduit line 190 is led outside the side wall 1, and is connected to the exhaust device or air supply device (not shown).

Also, in the first and second embodiments, the exhaust path or air supply path has a pipe shape extending upward from the second barrier wall, but the exhaust hole or air supply hole may be formed on the side wall to communicate with the exhaust device or air supply device. For example, a pipe body surrounding the side wall may be installed on an outer side of the side wall, and a space surrounded by the pipe body and the side wall may be used as a path for air supply or exhaustion.

In the second embodiment, gas supplied into the apparatus is air, but gas having an adjusted composition, such as a mixture gas of nitrogen and oxygen or the like, an inert gas such as argon or the like, or the like may be supplied into the apparatus.

In the first embodiment, exhaustion is performed from the intermediate section where the communication path is formed, but air supply may be performed on the lower section at the same time so as to prevent atmospheric pressure of the lower section from decreasing. Here, the air supply hole into the apparatus chamber may be provided at a location lower than the electrode tip 22a in a vertical direction, and an upper location from the lower end of the mold 2, so as to promote reduction of contamination due to fume.

In the second embodiment, air supply is performed on the intermediate section where the communication path is formed, but the air supply may be performed from the lower section at the same time, so as to reduce density of fume in the lower section.

Also, in the above embodiment, the lower section has a bottom surface, but a ceiling may be additionally formed on an upper side of the upper section. Here, gas may be supplied to the communication path while exhausting gas from the upper section, or gas may be exhausted from the communication path while supplying gas to the upper section.

Also, in the above embodiments, only exhaustion or air supply is performed on the communication path, but both exhaustion and air supply may be performed on the communication path at the same time.

For example, a third barrier wall may be formed on the second barrier wall, and a lower layer inserted between the first barrier wall and the second barrier wall, and an upper layer surrounded by the second barrier wall and the third barrier wall may be set in the intermediate section, so as to connect the air supply device to the upper layer and connect the exhaust device to the lower layer. Accordingly, gas is more effectively prevented from being mixed in the upper section and the lower section.

The present invention is not limited to the structure of each embodiment described above, as long as blocking or sealing of air flow is possible. Another configuration is possible. One example is a configuration where the through holes 18, 20, 210, or the like are provided so as to allow adjustment of the opening angle of the arc electrodes 22 penetrating through the barrier wall 6 constituting a ceiling portion that blocks the upper side of the apparatus chamber. The through holes 18 etc. are not covered and air flow is provided to the through holes 18 etc. so as to isolate the upper and lower portions of the barrier wall 6. Here, for example, the sheath body 7 in FIG. 5 is removed, and an ejection angle of the conduit line 190 is adjusted so that the blocking or sealing by the air flow is possible.

EXAMPLES

Example 1

One hundred vitreous silica crucibles having an outer diameter of 802 mm were manufactured by using the apparatus having the structure of the first embodiment. After the manufacturing, a yield was determined by visually inspecting products to determine whether impurities were adhered to the bottom surface and whether the bottom surface was uneven.

Comparative Example 1

One hundred vitreous silica crucibles having an outer diameter of 802 mm were manufactured by using an apparatus having a structure according to a conventional technology, which performs air supply and exhaustion to a lower section. After manufacturing, a yield was determined by visually inspecting products to determine whether impurities were adhered to the bottom surface and whether the bottom surface was uneven.

TABLE 1

|  | Example 1 | Comparative Example 1 |
| --- | --- | --- |
| Yield | 95% | 82% |

Table 1 shows inspection results of Example 1 and Comparative Example 1. Based on such results, it can be determined that productivity of the vitreous silica crucible in Example 1 according to the present embodiment is far better compared to Comparative Example 1 that does not control air flow inside the apparatus.

INDUSTRIAL APPLICABILITY

According to the present invention, in a process of manufacturing a vitreous silica crucible, circulation of gas may be separated in an upper section and a lower section of an apparatus used in the manufacturing process. Accordingly, damage and wear of an apparatus due to fume generated while vitrifying silica powder can be prevented while preventing contamination of a vitreous silica crucible due to dust or the like generated from the apparatus. Accordingly, according to the present invention, a high quality vitreous silica crucible that can be used to pull up a high purity semiconductor crystal can be supplied with stable productivity.

EXPLANATION OF REFERENCE NUMERALS

1: Side wall
2: Mold
3: Silica powder molded body
4: Mold driving unit
6: First barrier wall
8, 80: Second barrier wall
10: Sectioning member
7: Sheath body
12: Exhaust hole
13: Air supply hole
14: Exhaust path
15: Air supply path
16: Exhaust device
17: Air supply device
18: Lower communication hole
20: Upper communication hole
21, 210: Communication path
19, 190: Conduit line
22: Arc electrode
24: Electrode driving unit

What is claimed is:

1. An apparatus for manufacturing a vitreous silica crucible, comprising:
a mold having an inner surface having a bottom and a cylindrical shape;
a mold driving unit for rotating the mold;
at least two arc electrodes for generating an arc discharge; and
an electrode driving unit for driving the arc electrodes, and fusing and vitrifying a powder molded body formed of silica powder deposited on the inner surface of the mold through a discharge by the arc electrodes, the apparatus further comprising:
a lower section for accommodating the mold;
an upper section for accommodating the electrode driving unit; and
a sectioning member for isolating the upper section and the lower section, the sectioning member having at least one communication path, wherein the communication path is structured for allowing penetration of the arc electrodes; and
an air flow controlling unit for controlling air flow in the communication path such that exchange between gas inside the upper section and gas inside the lower section is suppressed,
wherein the sectioning member comprises first and second barrier walls having space therebetween, the space being disposed to separate the upper section and the lower section,
the communication path is provided in the first and second barrier walls, and
the air flow controlling unit comprises an exhaust device for exhausting gas in the space between the first barrier wall and the second barrier wall and an air supply device for supplying gas to the space between the first barrier wall and the second barrier wall.

2. The apparatus of claim 1, wherein the air flow controlling unit comprises an exhaust device capable of exhausting gas inside the communication path.

3. The apparatus of claim 1, wherein the air flow controlling unit comprises an air supply device capable of supplying gas into the communication path.

4. The apparatus of claim 1, wherein the air flow controlling unit comprises an exhaust device for exhausting gas from the lower section.

5. The apparatus of claim 1, wherein the air flow controlling unit comprises an air supply device for supplying gas to the lower section.

* * * * *